US006495983B1

(12) United States Patent
Stern

(10) Patent No.: US 6,495,983 B1
(45) Date of Patent: Dec. 17, 2002

(54) INTEGRATED CLOSED-LOOP PROGRAMMABLE MOTOR ASSEMBLY

(76) Inventor: Michael A. Stern, 1010 N. Maclay Ave., San Fernando, CA (US) 91340

( * ) Notice: Subject to any disclaimer, the term of this patent is extended or adjusted under 35 U.S.C. 154(b) by 34 days.

(21) Appl. No.: 09/892,642

(22) Filed: Jun. 28, 2001

(51) Int. Cl.[7] .............................................. G05B 19/10
(52) U.S. Cl. .................................................... 318/567
(58) Field of Search ................................ 318/560, 567, 318/568.1

(56) References Cited

U.S. PATENT DOCUMENTS

| | | | | |
|---|---|---|---|---|
| 5,250,884 A | * | 10/1993 | Okumura | 318/560 |
| 6,320,344 B1 | * | 11/2001 | Sakamoto et al. | 318/567 |
| 6,369,541 B1 | * | 4/2002 | Albert | 318/439 |
| 6,407,683 B1 | * | 6/2002 | Dreibelbis | 318/560 |

* cited by examiner

Primary Examiner—Jeffrey Donels
(74) Attorney, Agent, or Firm—Albert O. Cota

(57) ABSTRACT

An integrated, closed-loop programmable motor assembly (10) consisting of a bi-directional motor (12), a motor-shaft encoder (24), a rotation decoder (42), a microcontroller (64) and a motor drive circuit (70). In a typical application, the electric motor (12) is first programmed by placing the assembly (10) in a record mode and then rotating the motor shaft (14) to describe a desired motion. The motor shaft (14) can be made to rotate any amount, in any direction, and for any period of time. During the record mode, digital data corresponding to the motor shaft rotation is read from the motor shaft encoder (24) to the rotation decoder (42) and is subsequently stored in the memory circuit of the microcontroller (64). This data is recorded time synchronous, based on the time pulse produced by a time pulse generator (48). When the assembly (10) is placed in the playback mode, the stored position data is synchronously read by the microcontroller (64) via the rotation decoder (42), and the motor (12) rotates to reproduce the rotational data manually inserted during the record mode.

23 Claims, 4 Drawing Sheets

INTEGRATED CLOSED-LOOP PROGRAMMABLE MOTOR ASSEMBLY

TECHNICAL FIELD

The invention pertains to the general field of programmable motors, and more particularly to an integrated closed-loop programmable motor assembly having a record mode in which a manually selectable route is recorded, and a playback mode in which the route can be automatically duplicated at a subsequent time.

BACKGROUND ART

The prior art is replete with designs and assemblies, which utilize at least one electric motor to perform a variety of tasks. Typically these motor drive assemblies operate a motor that is controlled by a microcontroller, which is controlled by a software program. Included in the software program is a calibration routine that is implemented before the normal automatic control operation commences. If an operating problem is detected, a fault routine becomes operable to either correct the problem or terminate the operation to allow maintenance to be performed on the assembly.

The above prior art motor control assemblies are generally complex and require several "separate" components to comprise the overall assembly. Typically, these assemblies are used for tasks that are performed on relatively large and complex systems, such as used in the automotive and various machine shop industries. The applicant's design differs from the prior art in that a minimum amount of elements are utilized and the entire system is housed within a single enclosure. Depending on its use, the applicant's assembly can be produced with smaller components, as would be used in robotics, or with larger heavy-duty components, as used to operate larger machines.

A search of the prior art did not disclose any patents that read directly on the claims of the instant invention, however, the following U.S. patents were considered related:

| U.S. Pat. NO. | INVENTOR | ISSUED |
|---|---|---|
| 5,668,456 | Nakata, et al | 16 Sept. 1997 |
| 5,521,588 | Kuhner, et al | 28 May 1996 |
| 4,866,630 | Beaman, et al | 12 Sept. 1989 |

The U.S. Pat. No. 5,668,456 discloses a servo motor encoder in which signals are outputted via signal lines and output terminals, which are used in common. Incremental signals and servo motor magnetic pole position detection signals are switched by a multiplexer so as to output these signals via a common line driver. Alternatively, two line drivers are selectively activated and inactivated so that incremental signals and servo motor magnetic pole position detection signals are outputted via common signal lines.

The U.S. Pat. No. 5,521,588 discloses a method and apparatus for programming a plurality of control devices which includes a central control device having a non-volatile configuration memory. A bus system connects all the control devices in the vehicle to one another and to the central control device. When one of the control devices is retrofitted or replaced, it initiates a comparison of data located in its memory with the vehicle configuration data resident in the configuration memory of the central control device. In case of differences between these data, the data in the retrofitted or replaced control device is overwritten with current vehicle configuration data called-up from the vehicle configuration memory.

The U.S. Pat. No. 4,866,630 discloses an automatic sawing machine having an automatic workpiece shuttle, shuttle and stationary vises, an automatic saw blade feed, one or more incremental motion encoders and a programmable microcomputer. The microcomputer is capable of storing a series of sawing jobs wherein each job has a number of sawing steps. The microcomputer receives signals from the motion encoders to determine the shuttle and tilt position and uses these positions to control shuttle, tilt and vise operation. The microprocessor also receives motion increment signals from the motion encoders which are decoded to determine the direction in which the increment was traveled, and which are decoded in a manner which increases conventional accuracy by four.

For background purposes and as indicative of the art to which the invention relates, reference may be made to the following remaining patents found in the search:

| PATENT NO. | INVENTOR | ISSUED |
|---|---|---|
| 6,000,297 | Morimoto, et al | 14 Dec. 1999 |
| 5,943,914 | Morimoto, et al | 31 Aug. 1999 |
| 5,369,342 | Rudzewicz, et al | 29 Nov. 1994 |
| 4,583,032 | Nonziata, et al | 15 Apr. 1986 |
| 4,470,092 | Lombardi | 4 Sept. 1984 |
| 4,353,568 | Boyce | 12 Oct. 1982 |
| 3,755,726 | Knipe, et al | 28 Aug. 1973 |

DISCLOSURE OF THE INVENTION

The integrated, closed-loop programmable motor assembly is designed with an internal memory that allows manually inputted data pertaining to the rotational speed and the angular displacement of an electric motor shaft to be recorded. The recorded data is then automatically reproduced when the motor is placed in a playback mode. In its basic design, the integrated, closed-loop programmable motor assembly is comprised of A bi-directional electric motor which operates in a record mode and in a playback mode. When the motor, which is connected to a load and to a motor shaft encoder, is operated in the record mode, the motor shaft is manually rotated which allows the motor shaft encoder to produce an encoded digital signal corresponding to the rotational speed and angular displacement of the motor shaft;

A rotation decoder which is applied the encoded digital signal and produces a decoded digital signal corresponding to the rotational speed and angular displacement of the motor shaft; and A microcontroller having an internal memory. When the assembly is placed in the record mode, the decoded digital signal is stored in the microcontroller's internal memory. When the assembly is placed in the playback mode the microcontroller produces a motor drive signal. The motor drive signal is applied to a motor drive circuit, which produces a motor interface signal that applied to and allows the motor to automatically duplicate the speed and angular displacement of the motor shaft produced during the record mode.

To further enhance the design of the assembly, a time-pulse generator and an assembly control circuit are included with the basic design. The generator controls the precise timing sequence required to operate the assembly; the control circuit allows an operator to access and control the operation of the assembly. The assembly can be designed to operate with an internal battery, which allows the assembly to function as a stand-alone unit, or the assembly can incorporate an internal regulated power supply, which is connected to a utility power source by means of a power cable assembly.

During the record mode the motor shaft is manually rotated to traverse a particular speed and motion desired. A crystal controlled oscillator located in the time-pulse generator is used to produce synchronous timing pulses, which are produced periodically such as every $1/100^{th}$ of a second. The motor shaft encoder attached to the motor shaft produces counts corresponding to the rotational speed and angular displacement of the motor shaft, for example 360 counts per shaft revolution. Each time a timing pulse is produced it is applied to the rotation decoder from where a corresponding decoded digital signal is produced that is subsequently applied to and stored in the memory circuit of the microcontroller. Thus, the microcontroller memory stores the physical position of the motor shaft for every $1/100^{th}$ of a second. In other words, the memory stores 100 shaft counts per second where each count corresponds to the amount of shaft movement within each $1/100^{th}$ of a second.

During the playback mode the memory is synchronously accessed at the same time increments that occurred during the record mode. The memory is read by the microcontroller, which then produces a motor drive signal that drives the electric motor until the recorded signal of the motor rotation is reached. This process continues at a rate of 100 times a second until the final memory position is reached.

In a typical application of the assembly, the electric motor is first programmed by placing it in the record mode and then manually rotating the motor shaft to describe a desired motion. The motor shaft can be made to rotate any amount, in any direction, for any period of time. During the record mode, digital data corresponding To the motor shaft rotation is read from the motor shaft encoder and stored in the memory circuit of the microcontroller. This data is recorded time synchronous, based on the time pulse produced by the time pulse generator. When the assembly is placed in the playback mode the stored position data is synchronously read by the microcontroller via the rotation decoder, and the motor rotates to reproduce the rotational data manually inserted during the record mode.

In view of the above disclosure, the primary object of the invention is to produce an integrated; closed-loop programmable motor assembly, which is packaged in a single enclosure and that, operates in a record mode and in a playback mode. In the record mode the assembly is manually programmed, in the playback mode the data acquired during the record mode is automatically duplicated. In addition to the primary object of the invention, it is also an object of the invention to produce an assembly that:

can be produced in various sizes to accommodate the particular load requirement of the assembly;

can be used to operate robotics, various machinery and toys, can be designed to operate with an internal power source as a self-contained assembly, or can be designed with an internal power source that is connected, via a power cable assembly, to an a-c utility power source, is reliable and relatively maintenance free, and is cost effective from both a manufacturer and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
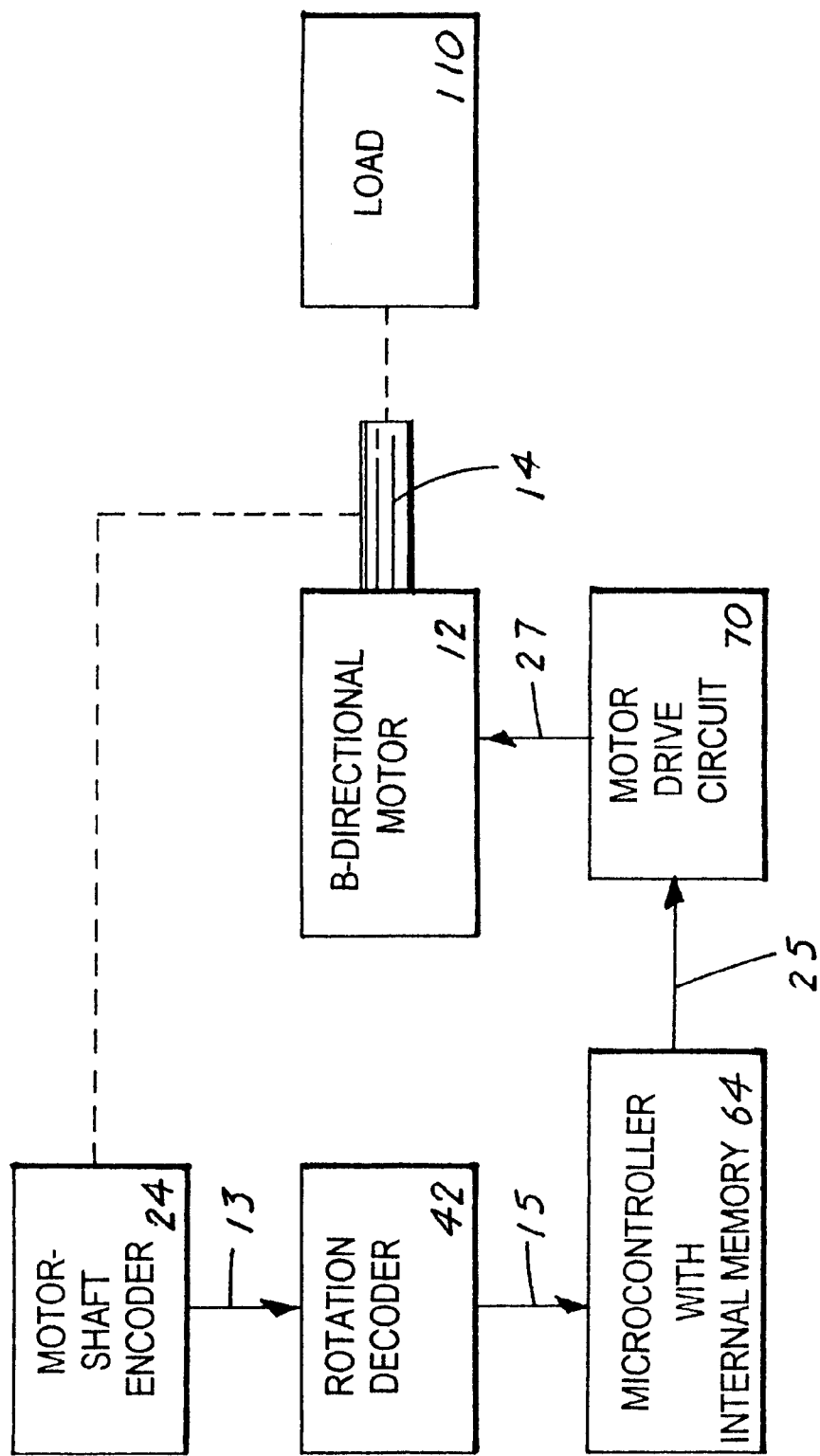
FIG. 1 is a block diagram showing the basic design of the integrated, closed-loop programmable motor assembly.
Figure 2:
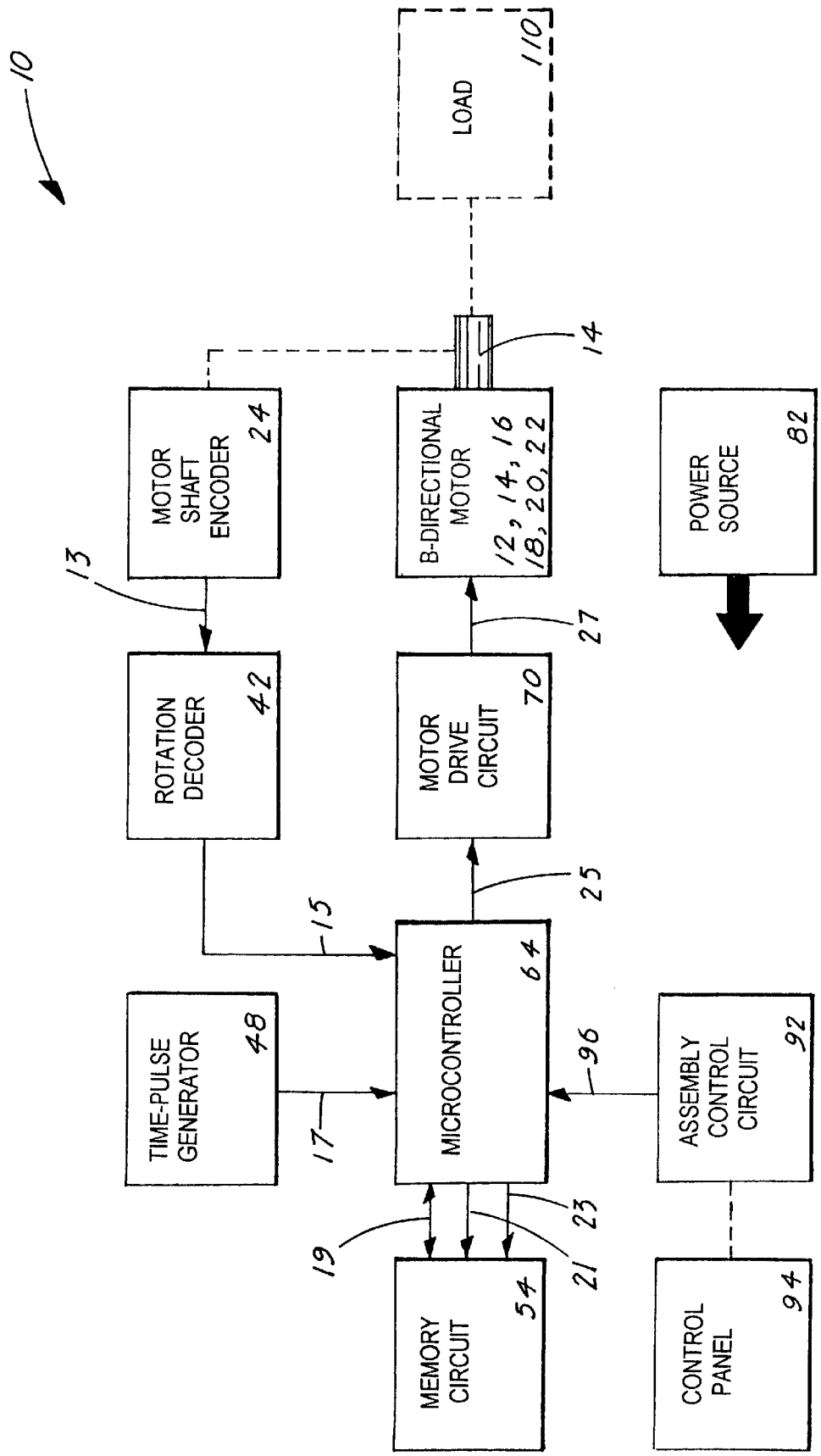
FIG. 2 is a block diagram of a fully implemented assembly.

The best mode for carrying out the invention is presented in terms of a preferred embodiment for an integrated, closed-loop programmable motor assembly 10, (hereinafter"assembly 10"), which allows a manually inserted, positional motion or route to be automatically duplicated at a later time. The preferred embodiment, as shown in FIGS. 1–7, is comprised of the following major elements: a bi-directional electric motor 12, a motor shaft encoder 24, a rotation decoder 42, a time-pulse generator 48, a memory circuit 54, a microcontroller 64, a motor drive circuit 70, a power source 82, an assembly control circuit 92 and a single enclosure 100. The basic configuration of the assembly 10 is shown in FIG. 1, and the assembly with a full complement of elements is shown in FIG. 2.

The bi-directional electric motor 12, which can be comprised of either a d-c motor 16, an a-c motor 18, a servo motor 20 or a stepper motor 22, is designed to operate in either a record mode or in a playback mode. Each motor includes a motor shaft 14 that is connected to a load 110 and to a motor shaft encoder 24. When the motor 12 is operated in the record mode, the motor shaft encoder 24 produces an encoded digital signal 13 corresponding to the rotational speed and angular displacement of the motor shaft 14.

Figure 3:
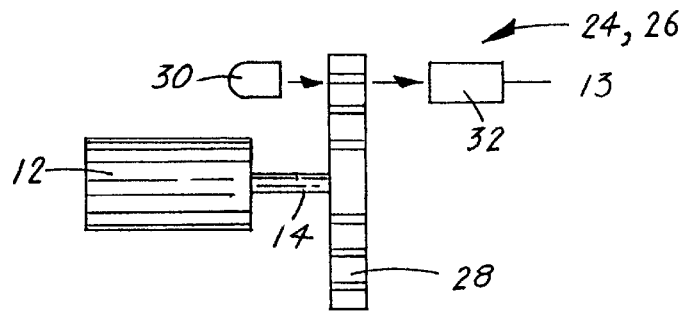
FIG. 3 is a simplified block diagram of a motor shaft encoder configured as an optical encoder.
Figure 4:
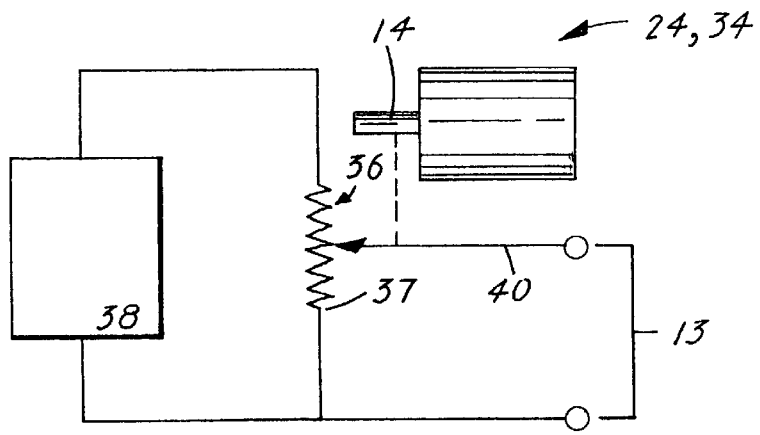
FIG. 4 is a simplified block diagram of a motor shaft encoder configured as a resistive network.

The motor shaft encoder 24, as shown in FIGS. 2, 3 and 4, is preferably comprised of an optical encoder 26, as shown in FIG. 3, consisting of an optically coded disk 28, a light source such as an LED 30 and an optical detector 32. The disk 28 is attached to the motor shaft 14, the LED is positioned adjacent to the disk 28 and the optical detector is positioned to intercept the light beam projected from the LED 30 through the optically coded disk 28. When the disk 28 rotates, the breaking of the light beam produces a flashing light, which is in accord with the rotational speed of the motor shaft 14. The flashing beam is then applied to the optical detector 32 from where the encoded digital signal 13 is produced and applied to the rotation encoder 42.

Optionally, the motor shaft encoder 24, as shown in FIG. 4, can be comprised of a resistive network 34 consisting of a variable resistor, such as a potentiometer 36. The resistive element 37 of the potentiometer is connected across a voltage source 38 and the potentiometer's rotating arm 40 is connected to the motor shaft 14. The potentiometer functions as a voltage divider which produces a voltage which is proportional to the angular displacement of the shaft 14, and that is taken across the arm 40 and one end of the potentiometer's resistive element 37. The voltage from the potentiometer 36 is applied to an ADC that converts the analog voltage to a corresponding digital signal. In either design, the encoder 24 produces the encoded digital signal 13 which corresponds to the rotational speed and angular displacement of the motor shaft 14.

The encoded digital signal 13 from the motor shaft encoder 24 is applied to the rotation decoder 42, as shown in FIG. 2. The decoder 42 typically is comprised of a set of logic elements which receive and process the encoded digital signal 13. The decoder 42 produce a decoded digital signal 15, corresponding to the rotational speed and angular displacement of the motor shaft 14, which is then applied to the microcontroller 64.

The time pulse generator 48, as shown in FIG. 2, is preferably comprised of a crystal controlled oscillator which provides the means for controlling the precise timing sequence required to operate the assembly 10. The output of the generator 48 is a timed clock signal 17 that is applied to the microcontroller 64.

The memory circuit 54, as also shown in FIG. 2, provides the means for storing the speed and rotational history of the motor shaft 14. The circuit 54 can be comprised of several circuits including a Random Access Memory (RAM) 56, a Static Random-Access Memory (SRAM) 58 which does not require a periodic refresh signal, or a Dynamic Random-Access Memory (DRAM) 60 which does require that a refresh signal be applied periodically. In whatever circuit design is used the memory circuit 54, which can be designed to be internal or external to the microcontroller 64, produces an input/output signal 19 that operates the microcontroller. The microcontroller 64 provides the means by which the operation of the assembly 10 is controlled. The microcontroller 64 is designed to be applied:

1. The digital signal 15 from the rotation decoder 42;
2. The timed clock signal 17 from the time-pulse generator 48, and
3. The input/output data signal 19 forms the memory circuit 54.

The output of the microcontroller 64 is an address signal 21 and a read/write signal 23 that are both applied to the memory circuit 54. When the assembly is in the playback mode the microcontroller 64 also produces a motor drive signal 25 that is applied to the motor drive circuit 70. The design selected for the motor drive circuit 70 is dependent upon the type of electric motor 12 utilized.

Figure 5:
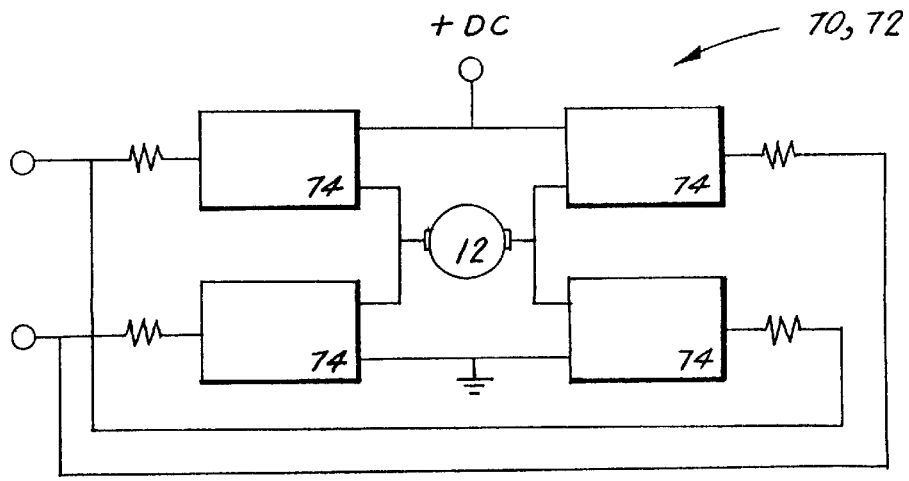
FIG. 5 is a simplified block diagram of a motor drive circuit is configured as an H-bridge circuit.
Figure 6:
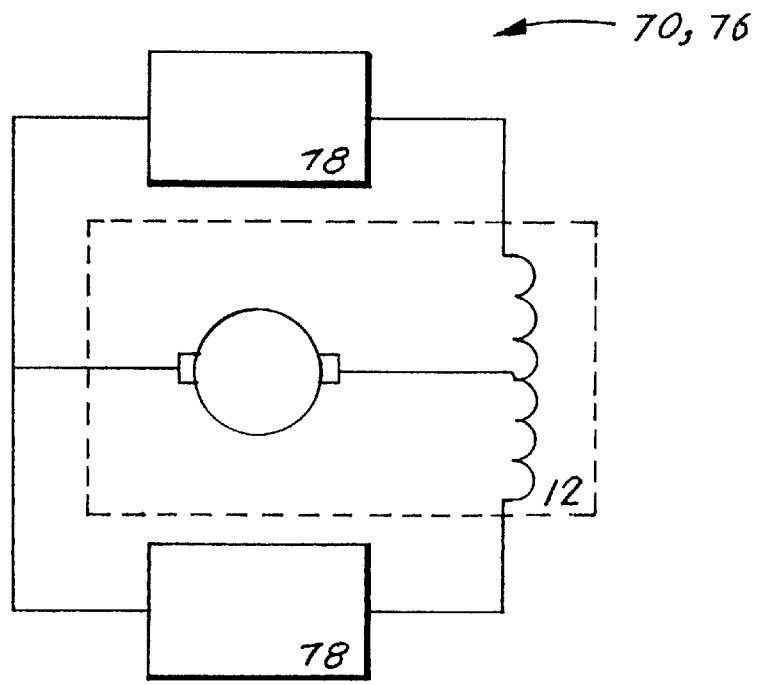
FIG. 6 is a simplified block diagram of a motor drive circuit of two series pass elements.

When the bi-directional electric motor 12 consists of a d-c motor, the motor circuit 70 is comprised of an H-bridge circuit 72. The circuit 72, as typically shown in FIG. 5, is comprised of four solid-state switches 74, which can consist of MOSFETs or transistors. The switches 74 produce and control the output of a motor interface signal 27 which is applied to the motor 12, as shown in FIG. 2. When the electric motor 12 consists of an a-c motor 12, the motor drive circuit 70, as shown in FIG. 6, is comprised of a series pass circuit 76 that uses two series pass elements 78 which preferably consist of TRIACs 80. The two pass elements 78 function to switch applicable motor windings to control the direction of rotation of the a-c motor. When the electric motor 12 consists of a stepper motor 22 (not shown), the motor drive circuit 70 consists of a combination phase control and drive circuit, which produces and controls the application of the motor interface signal 27 applied to the windings of the stepper motor 12.

The assembly 10 is designed to be operated by a power source 82 which can consist of an internal battery 84 or, if the assembly 10 is to be connected to a utility power source, the power source is comprised of an internal regulated power supply 86. The power supply 86 has an input 88 that is connected to the utility power via a cable assembly 90.

The final element comprising the integrated closed-loop programmable motor assembly 10 is the assembly control circuit 92. The circuit 92 is comprised of a control panel 94 having a set of switches and indicators that allow a user of the assembly 10 to control its operation. The control panel 94 is connected to the microcontroller 64 via a cable assembly 96.

Figure 7:
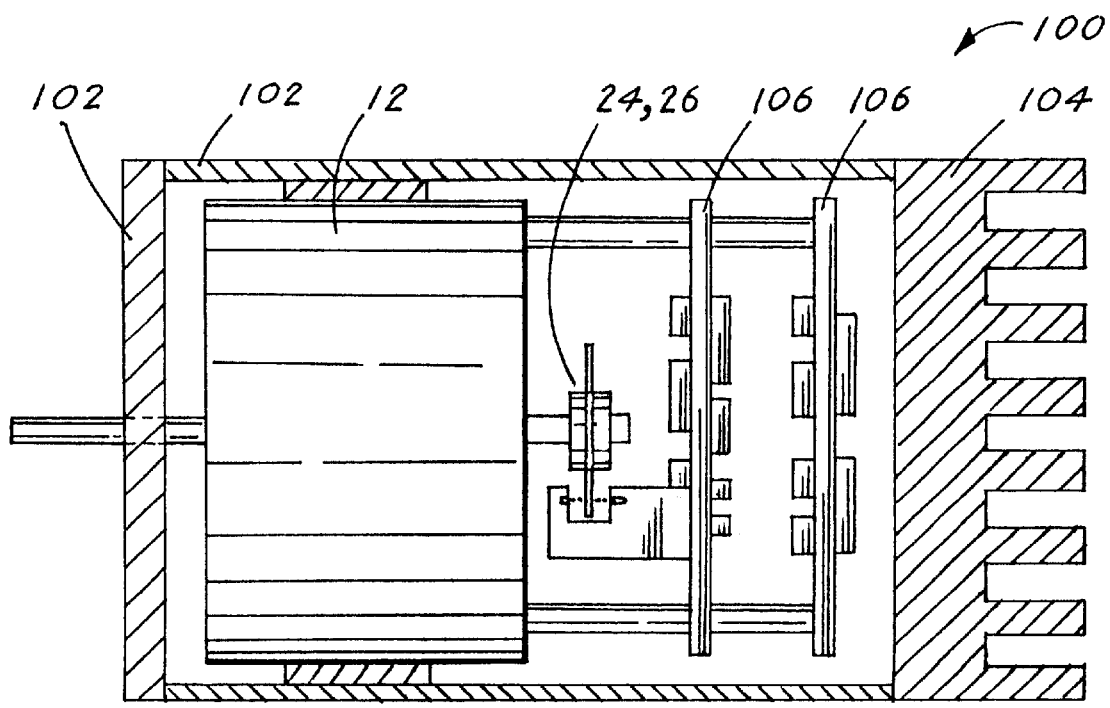
FIG. 7 is an elevational-sectional and partial view of a typical enclosure, which houses all the elements of the integrated closed-loop programmable motor assembly.

All the elements that comprise the assembly 10 are dimensioned to be housed within the single enclosure 100, as shown in FIG. 7. A typical enclosure includes a housing 102 that includes a heat sink 104. Within the enclosure 100 is located at least one circuit board 106 which has attached most of the assembly elements. The motor shaft encoder 24 is juxtaposed within the housing 102 to allow the motor rotation to interface with the encoder 24, which in this illustration consists of an optical encoder 26.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms that may come within the language and scope of the appended claims.

What is claimed is:

1. An integrated, closed-loop programmable motor assembly comprising:
    a) a bi-directional electric motor which operates in a record mode and in a playback mode, wherein said motor includes a motor shaft that is connected to a load and to a motor-shaft encoder, wherein when said motor is operated in the record mode the motor shaft is manually rotated, which allows said motor-shaft encoder to produce an encoder digital data signal corresponding to the rotational speed and angular displacement of the motor shaft,
    b) a rotation decoder which is applied the encoded digital signal from said motor shaft encoder and produces a decoded digital signal corresponding to the rotational speed and angular displacement of the motor shaft, and
    c) a microcontroller having an internal memory, wherein when said assembly is placed in the record mode, the decoded digital signal is applied and stored in the internal memory, wherein when said assembly is placed in the playback mode, said microcontroller produces a motor drive circuit that is applied to a motor drive circuit which produces a motor interface signal which is applied to and allows said motor to automatically duplicate the speed and angular displacement of the motor shaft produced during the record mode.

2. The assembly as specified in claim 1 further comprising a time-pulse generator having means for controlling the precise timing sequence of said assembly, wherein said generator produces a time clock signal that is applied to said microcontroller.

3. The assembly as specified in claim 2 further comprising an assembly control circuit having means for allowing an operator to access and control the operation of said assembly.

4. The assembly as specified in claim 3 further comprising a power source having means for producing a regulated voltage to operate said assembly.

5. An integrated closed-loop programmable motor assembly comprising:
   a) a bi-directional electric motor which operates in either a record mode or in a playback mode, wherein said motor includes a motor shaft that is connected to a load,
   b) a motor shaft encoder having means for being attached to the motor shaft, wherein when said motor is operated in the record mode said encoder produces an encoded digital signal corresponding to the rotational speed and angular displacement of the motor shaft,
   c) a rotation decoder which receives the encoded digital signal from said motor shaft encoder and produces a decoded digital signal corresponding to the rotational speed and angular displacement of the motor shaft,
   d) a time-pulse generator having means for controlling the precise timing sequence of said assembly, wherein said generator produces a timed clock signal,
   e) a memory circuit having means for storing the speed and rotational history of the motor shaft, wherein said circuit produces an input/output data signal,
   f) a microcontroller having means for controlling the operation of said system, wherein said microcontroller is applied:
      (1) the decoded digital signal from said rotation decoder which corresponds to the rotational speed and angular displacement of the motor shaft,
      (2) the timed lock signal from said time pulse generator, and
      (3) the input/output data signal from said memory circuit, wherein said microcontroller produces an address signal and a read/write signal that are applied to the memory circuit, wherein when said assembly is in the playback mode said microcontroller produces a motor drive signal,
   g) a motor drive circuit having means for processing the motor drive signal and producing a motor interface signal which allows said motor to automatically duplicate the rotational speed and angular displacement of the motor shaft produced during the record mode,
   h) an assembly control circuit connected to said microcontroller via a cable assembly, wherein said circuit allows an operator to access and control the operation of said assembly, and
   i) a power source having means for producing a regulated voltage to operate said assembly.

6. The assembly as specified in claim 5 wherein said bi-directional electric motor is comprised of a d-c motor.

7. The assembly as specified in claim 5 wherein said bi-directional electric motor is comprised of an a-c motor.

8. The assembly as specified in claim 5 wherein said bi-directional electric motor is comprised of a servo-motor.

9. The assembly as specified in claim 5 wherein said bi-directional electric motor is comprised of a stepper motor.

10. The assembly as specified in claim 5 wherein said motor shaft encoder is comprised of an optical encoder comprising:
   a) an optically coded disk that is attached to the motor shaft,
   b) a light source positioned to interface with the optically encoded disk, and
   c) a stationary optical detector that intercepts the light from the optically coded disk and produces an encoded digital signal.

11. The assembly as specified in claim 5 wherein said motor shaft encoder is comprised of a potentiometer having its resistive element connected across a voltage reference source, and its rotating arm connected to the motor shaft, wherein said potentiometer functions as a voltage divider whose output voltage corresponds to the position of the motor shaft.

12. The assembly as specified in claim 5 wherein the coded digital signal produced by said motor shaft encoder is a dual output phase, quadrature signal that when decoded by said rotation decoder, the rotational speed and angular displacement of the motor shaft is determined.

13. The assembly as specified in claim 5 wherein said time pulse generator includes a crystal controlled oscillator that provides the means for controlling the precise timing sequence of said assembly.

14. The assembly as specified in claim 5 wherein said memory circuit comprises a Random Access Memory (RAM).

15. The assembly as specified in claim 5 wherein said memory circuit comprises a Static Random-Access Memory (SRAM) which does not require a periodic refresh signal.

16. The assembly as specified in claim 5 wherein said memory circuit comprises a Dynamic Random-Access Memory (DRAM) which requires that a refresh signal be applied periodically.

17. The assembly as specified in claim 5 wherein said motor drive circuit is comprised of an H-bridge circuit comprising four solid state switches which produce and control the application of the motor interface signal when said bi-directional electric motor is comprised of a d-c motor.

18. The assembly as specified in claim 5 wherein said motor drive circuit is comprised of a series pass circuit consisting of two series pass elements which switch applicable motor windings to control the direction of rotation when said bi-directional electric motor is comprised of an a-c motor.

19. The assembly as specified in claim 5 wherein said motor drive circuit is comprised of a combination phase control and drive circuit which produces and controls the application of the motor interface signal when said bi-directional electric motor is comprised of a stepper motor.

20. The assembly as specified in claim 5 wherein said power source is comprised of a battery.

21. The assembly as specified in claim 5 wherein said power source is comprised of a regulated power supply connected to a utility power source via a power cable assembly.

22. The assembly as specified in claim 5 wherein said assembly control circuit further comprises a control panel connected via a cable assembly to said microcontroller, wherein said control panel includes a set of switches and indicators that assist an operator to control the operation of said assembly.

23. An integrated closed-loop programmable motor assembly comprising:
   a) a bi-directional d-c motor which operates in a record mode and in a playback mode, wherein said motor includes a motor shaft that is connected to a load,
   b) a motor shaft encoder comprising:
      (1) an optically coded disk that is attached to the motor shaft, and
      (2) a stationary optical pick-up that reads the output of the optically coded disk and produces an encoded digital signal corresponding to the rotational speed and angular displacement of the motor shaft, c) a rotational decoder comprising a set of logic elements which receive and process the encoded digital signal from said stationary optical pick-up and produces a decoded digital signal corresponding to the rotational speed and angular displacement of the motor shaft, d) a time pulse generator which comprises a crystal controlled oscillator that produces a timed clock signal which controls the precise timing sequence of said assembly, e) a memory circuit comprising a Random Access Memory (RAM) having means for storing the speed and rotational history of the motor shaft, wherein said circuit produces an input/output data signal, f) a microcontroller having means for controlling the operation of said system, wherein said microcontroller is applied:
  (1) the decoded digital signal is from said rotation decoder which corresponded to the rotational speed and angular displacement of the motor shaft,
  (2) the timed clock signal from said time pulse generator, and
  (3) the input/output data signal from said memory circuit, wherein said microcontroller produces an address signal and a read/write signal that are applied to said memory circuit, wherin when said assembly is in the playback mode said microcontroller produces a motor drive signal, g) a motor drive circuit comprised of an H-bridge circuit incorporating series pass elements which control the polarity of a motor interface signal which is applied to and allows said motor to automatically duplicate the rotational speed and angular displacement of the motor shaft produced during the record mode, h) an assembly control circuit connected to said microcontroller via a cable assembly, wherein said circuit having a control panel which includes a set of switches and indicators that assist an operator to control the operation of said assembly, and i) a power source having means for producing the required power to operate said assembly.

* * * * *